US011973333B2

(12) United States Patent
Miao et al.

(10) Patent No.: US 11,973,333 B2
(45) Date of Patent: Apr. 30, 2024

(54) METHOD AND APPARATUS FOR DETERMINING PHASE LOCKING OF CRITICAL ARC LIGHT

(71) Applicant: Wuxi Power Supply Branch of State Grid Jiangsu Electric Power Co., Ltd., Jiangsu (CN)

(72) Inventors: Jin Miao, Jiangsu (CN); Ping Chen, Jiangsu (CN); Yin Gu, Jiangsu (CN); Xi Wu, Jiangsu (CN); Jun Qin, Jiangsu (CN); Bin Fei, Jiangsu (CN); Junfeng Wu, Jiangsu (CN); Zhaoyun Leng, Jiangsu (CN); Ming Ren, Shaanxi (CN)

(73) Assignee: Wuxi Power Supply Branch of State Grid Jiangsu Electric Power Co., Ltd., Wuxi (CN)

( * ) Notice: Subject to any disclaimer, the term of this patent is extended or adjusted under 35 U.S.C. 154(b) by 0 days.

(21) Appl. No.: 18/164,645

(22) Filed: Feb. 6, 2023

(65) Prior Publication Data

US 2023/0187920 A1   Jun. 15, 2023

Related U.S. Application Data

(63) Continuation of application No. PCT/CN2022/126069, filed on Oct. 19, 2022.

(30) Foreign Application Priority Data

Oct. 19, 2021 (CN) .......................... 202111224145.6

(51) Int. Cl.
*H02H 1/00* (2006.01)
*H02H 7/22* (2006.01)

(52) U.S. Cl.
CPC ........ *H02H 1/0023* (2013.01); *H02H 1/0069* (2013.01); *H02H 7/222* (2013.01)

(58) Field of Classification Search
CPC .. H02H 1/0023; H02H 1/0015; H02H 1/0069; H02H 7/222
See application file for complete search history.

(56) References Cited

U.S. PATENT DOCUMENTS

2006/0203401 A1* 9/2006 Kojori .................. H02H 1/0092
361/42
2009/0161272 A1* 6/2009 Asokan ................ G01R 31/088
324/536

(Continued)

FOREIGN PATENT DOCUMENTS

CN          111913041 A       11/2020

*Primary Examiner* — Scott Bauer (57) ABSTRACT

A method for determining phase locking of critical arc light includes: step 1: monitoring and collecting light radiation intensity of an arc inside a switch cabinet in real time, and converting the collected light radiation intensity into an electrical signal; step 2: extracting a power-frequency fundamental wave of the electrical signal, comparing an amplitude of the power-frequency fundamental wave of the electrical signal with a first threshold, and generating a pre-warning signal based on a comparison result of the first threshold; step 3: comparing the amplitude of the power-frequency fundamental wave of the electrical signal with a second threshold voltage, and generating a control signal based on a comparison result of the second threshold voltage and a protection time threshold; and step 4: protecting the switch cabinet under the critical arc light environment based on the pre-warning signal and the control signal.

15 Claims, 5 Drawing Sheets

(56) References Cited

U.S. PATENT DOCUMENTS

2014/0168843 A1\* 6/2014 Privitera ................ G01R 31/50
                                                    702/58
2019/0324075 A1\* 10/2019 Kinsella ............... G01R 15/183
2021/0281061 A1\* 9/2021 Song ..................... H01M 10/48

\* cited by examiner

METHOD AND APPARATUS FOR DETERMINING PHASE LOCKING OF CRITICAL ARC LIGHT

CROSS REFERENCE TO RELATED APPLICATIONS

The present application is a Continuation Application of PCT Application No. PCT/CN2022/126069 filed on Oct. 19, 2022, which claims the benefit of Chinese Patent Application No. 202111224145.6 filed on Oct. 19, 2021. All the above are hereby incorporated by reference in their entirety.

TECHNICAL FIELD

The present disclosure relates to the field of power equipment, and more specifically, to a method and an apparatus for determining phase locking of critical arc light.

BACKGROUND

At present, in a power system, a switch cabinet plays an important role as a main element for opening and closing, controlling, and protecting electric equipment in power generation, transmission, distribution, and transformation processes. Elements inside the switch cabinet mainly include a circuit breaker, an isolating switch, a load switch, an operating mechanism, a transformer, and various protective apparatuses.

These elements will have high-probability and irregular abnormal discharge due to various abnormal factors during operation. The abnormal discharge not only damages and breaks down insulating parts of the elements inside the switch cabinet, but also causes a bus-to-ground short circuit or an interphase short circuit in serious cases to result in an arc, which makes the switch cabinet damaged or even exploded. This problem seriously threatens safety of a device, a power grid, and operation and maintenance personnel.

Real-time and effective monitoring and determining of an intermittent arc and a penetrating arc in the switch cabinet can not only provide effective pre-warning for a potential risk of the power grid, but also timely protect against a power grid fault. In the switch cabinet, discharge often occurs during transportation and transfer of strong electricity. Therefore, whether the discharge causes arc light becomes an effective criterion to determine whether the discharge is abnormal discharge.

In the prior art, an arc light protection system of the switch cabinet has been adopted to alarm and protect against the abnormal discharge of the switch cabinet. Generally, the arc light protection system uses an arc light sensor to collect arc light intensity in a busbar room or in a cable chamber, uses an inductance coil to collect a bus current, determines, based on the collected arc light intensity and bus current, whether the abnormal discharge occurs, and performs a protective action.

However, this method in the prior art can determine the abnormal discharge only based on an abnormal bus current. This is equivalent to a default condition that the abnormal discharge is only caused by the penetrating arc, and abnormal discharge caused by an intermittent current is excluded. As a result, when the intermittent current causes an abnormality of the switch cabinet and event an abnormality of the power grid, the arc light protection system in the prior art cannot perform protective actions on the elements inside the switch cabinet, resulting in many potential safety risks.

In addition, in the prior art, a device needs to be connected to a plurality of inductance coils and an ultraviolet photoelectric detector to perform detection and information collection, which results in high system complexity, a high hardware cost, and a complex installation and maintenance process.

Finally, in the prior art, only total arc light intensity can be used, and the abnormal discharge is determined based on the total light intensity, which is vulnerable to impacts of various factors such as external ambient light. As a result, a determining result is of low accuracy, and it is difficult to reasonably set time of trigging the protective action. Therefore, the protection method in the prior art is easy to trigger protection by mistake, thereby reducing operation efficiency of the power grid, and is also easy to miss the protective action in the case of a real fault, resulting in the power grid fault.

Therefore, it is urgent to develop a new method and apparatus for determining phase locking of critical arc light.

SUMMARY

In order to resolve the shortcomings in the prior art, the present disclosure is intended to provide a method and an apparatus for determining phase locking of critical arc light, to extract a power-frequency fundamental wave from an arc light signal, and obtain pre-warning and control signals through calculation based on an amplitude of a power-frequency fundamental signal, so as to perform a protective action.

The present disclosure adopts the following technical solutions. A first aspect of the present disclosure provides a method for determining phase locking of critical arc light. The method includes the following steps: step 1: monitoring and collecting light radiation intensity of an arc inside a switch cabinet in real time, and converting the collected light radiation intensity into an electrical signal; step 2: extracting a power-frequency fundamental wave of the electrical signal, comparing an amplitude of the power-frequency fundamental wave of the electrical signal with a first threshold, and generating a pre-warning signal based on a comparison result of the first threshold; step 3: comparing the amplitude of the power-frequency fundamental wave of the electrical signal with a second threshold voltage, and generating a control signal based on a comparison result of the second threshold voltage and a protection time threshold; and step 4: protecting the switch cabinet under the critical arc light environment based on the pre-warning signal and the control signal.

Preferably, in step 2, the first threshold U1 is compared with a maximum amplitude of a power-frequency fundamental signal Uac, and when the maximum amplitude of the power-frequency fundamental signal Uac is greater than or equal to the first threshold U1, the pre-warning signal is generated.

Preferably, the first threshold U1 is generated based on a maximum amplitude of the electrical signal; and when the maximum amplitude of the electrical signal is Ut, the first threshold U1 is Ralert*Ut, where Ralert represents a preset pre-warning constant.

Preferably, in step 3, the second threshold voltage Um is compared with an amplitude of a power-frequency fundamental signal Uac, and when the amplitude of the power-frequency fundamental signal Uac is greater than or equal to the second threshold voltage Um, the control signal is generated.

Preferably, in step 3, the control signal is generated in the following manner: when the amplitude of the power-frequency fundamental signal Uac is greater than or equal to the second threshold voltage Um, a second-threshold comparison signal is output as a high-level signal; or when the amplitude of the power-frequency fundamental signal Uac is less than the second threshold voltage Um, the second-threshold comparison signal is output as a low-level signal; and when a duty ratio of the second-threshold comparison signal is greater than a specified duty ratio threshold Rp, the control signal is generated.

Preferably, if the duty ratio of the second-threshold comparison signal is less than the specified duty ratio threshold Rp at current time, the duty ratio of the second-threshold comparison signal is compared with the specified duty ratio threshold Rp again after a time delay $\Delta t$, and the control signal is generated until the duty ratio of the second-threshold comparison signal is greater than the specified duty ratio threshold Rp.

A second aspect of the present disclosure provides an apparatus for determining phase locking of critical arc light, including a collection module, a first comparison module, a second comparison module, and a control module, where the collection module is configured to monitor and collect light radiation intensity of an arc inside a switch cabinet in real time, and convert the collected light radiation intensity into an electrical signal; the first comparison module is configured to extract a power-frequency fundamental wave of the electrical signal, compare an amplitude of the power-frequency fundamental wave of the electrical signal with a first threshold, and generate a pre-warning signal based on a comparison result of the first threshold; the second comparison module is configured to compare an amplitude of the power-frequency fundamental wave of the electrical signal with a second threshold voltage, and generate a control signal based on a comparison result of the second threshold voltage and a protection time threshold; and the control module is configured to protect the switch cabinet under the critical arc light environment based on the pre-warning signal and the control signal.

Preferably, the collection module includes an ultraviolet light probe and a current-to-voltage converter, where the ultraviolet light probe is an ultraviolet avalanche photodiode, which is disposed in the switch cabinet to collect light radiation intensity inside the switch cabinet, and an output terminal of the ultraviolet light probe is connected to an input terminal of the current-to-voltage converter; and the current-to-voltage converter converts a current signal of the light radiation intensity collected by the ultraviolet light probe into a voltage signal, and an output terminal of the current-to-voltage converter is connected to the first comparison module.

Preferably, the first comparison module includes a phase-locked amplifier and a pre-warning unit, where the phase-locked amplifier with an input terminal connected to a first output terminal of the current-to-voltage converter and an output terminal connected to the pre-warning unit is configured to extract a power-frequency fundamental signal Uac from the electrical signal and input the power-frequency fundamental signal into the pre-warning unit; and the pre-warning unit with an input terminal connected to the first output terminal of the current-to-voltage converter and an output terminal connected to an external upper computer system is configured to compare the first threshold U1 with an amplitude of the power-frequency fundamental signal Uac, and send the pre-warning signal to the external upper computer system.

Preferably, the first comparison module further includes a first level control unit; and the first level control unit is configured to obtain a power frequency and generate a sampling frequency of the phase-locked amplifier based on the power frequency.

Preferably, the sampling frequency of the phase-locked amplifier ranges from 50 Hz to 60 Hz.

Preferably, the second comparison module includes a hysteresis comparator and a determining unit, where the hysteresis comparator with an input terminal connected to the output terminal of the phase-locked amplifier and an output terminal connected to the determining unit is configured to compare the second threshold voltage Um with the amplitude of the power-frequency fundamental signal Uac, and send a second-threshold comparison signal to the determining unit; and the determining unit with an input terminal connected to the output terminal of the hysteresis comparator and an output terminal connected to an external relay protection unit is configured to determine a duty ratio of the second-threshold comparison signal, generate the control signal, and send the control signal to the external relay protection unit.

Preferably, the second comparison module further includes a second level control unit; and the second level control unit is configured to control a value of the second threshold voltage Um of the hysteresis comparator.

Preferably, the second level control unit generates the second threshold voltage Um based on control of an external encoder, and controls the hysteresis comparator based on the second threshold voltage Um; and the external encoder is connected to the external relay protection unit, and configured to encode a reference level of the second threshold voltage Um based on an instruction issued by the external relay protection unit.

Preferably, the apparatus for determining phase locking of critical arc light includes a plurality of channels, where each channel is configured to collect light radiation intensity of one arc and generate one pre-warning signal and one control signal based on the light radiation intensity of the arc; and the apparatus provides an input port, a pre-warning signal output port, and a control signal output port for each signal.

The present disclosure has the following beneficial effects compared with the prior art: The method and the apparatus for determining phase locking of critical arc light can extract a power-frequency fundamental wave from an arc light signal, and obtain pre-warning and control signals through calculation based on an amplitude of a power-frequency fundamental signal, so as to perform a protective action. The method in the present disclosure is characterized by simple ideas, simple apparatuses, elements, and structures, low system complexity, low hardware costs, and easy installation and maintenance.

The present disclosure also has the following beneficial effects:

1. When a bus current is abnormal, the present disclosure only needs to collect one kind of signal, namely, arc light intensity, and does not need to use an inductance coil to detect the bus current. Therefore, the present disclosure saves installation, maintenance, and use costs of a large quantity of inductance coils, and reduces complexity of the apparatus.

2. The present disclosure can identify a power frequency component in arc light by using a phase-locked amplifier, and only determines signal intensity of the power frequency component, which has a high confidence level, and is more reliable than an intensity determining basis of an arc light detection system in the prior art.

3. The present disclosure does not take the bus current as a necessary criterion, and an abnormality that may be caused by an intermittent arc is also included in the protection scope, which improves a safety protection capability of a power grid.

4. The present disclosure can track abnormal discharge in real time, and convert the abnormal discharge into a critical state of a stable arc, thereby realizing fast and accurate protection. Protection time is set, which not only greatly reduces a probability of false protection, but also improves accuracy and timeliness of reasonable protection.

In summary, the method in the present disclosure can protect safety of equipment and personnel to a greatest extent from being threatened by a high-energy arc, and ensure safe and continuous operation of the power grid.

DETAILED DESCRIPTION

The present disclosure is further described below with reference to the accompanying drawings. The following embodiments are only used for describing the technical solutions of the present disclosure more clearly, and are not intended to limit the protection scope of the present disclosure.

Figure 1:
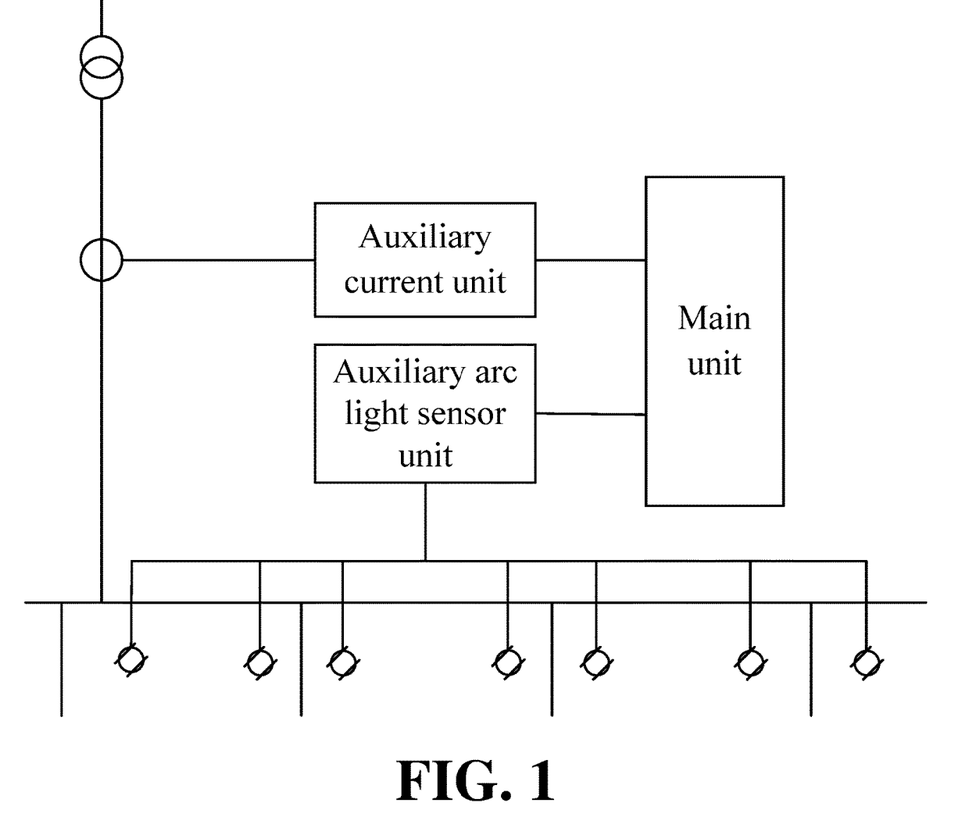
FIG. 1 is a schematic diagram of a frame structure of an arc light protection system in the prior art.

FIG. 1 is a schematic diagram of a frame structure of an arc light protection system in the prior art. As shown in FIG. 1, the arc light protection system in the prior art includes an auxiliary current unit, an auxiliary arc light sensor unit, and a main unit. The auxiliary current unit can use a Rogowski coil and a Hall coil to measure a bus current, and the auxiliary arc light sensor unit can detect arc light in a bus of a switch cabinet or in a cable chamber based on an ultraviolet light probe, and record light radiation intensity in real time.

In addition, the main unit can determine, based on a level threshold, intensity of two signals generated by the auxiliary arc light sensor unit and the auxiliary current unit. When the intensity of each of the two signals exceeds the specified threshold, it means that the signal intensity in the present disclosure meets a sufficient condition for starting protection, and a protective action should be performed.

Figure 2:
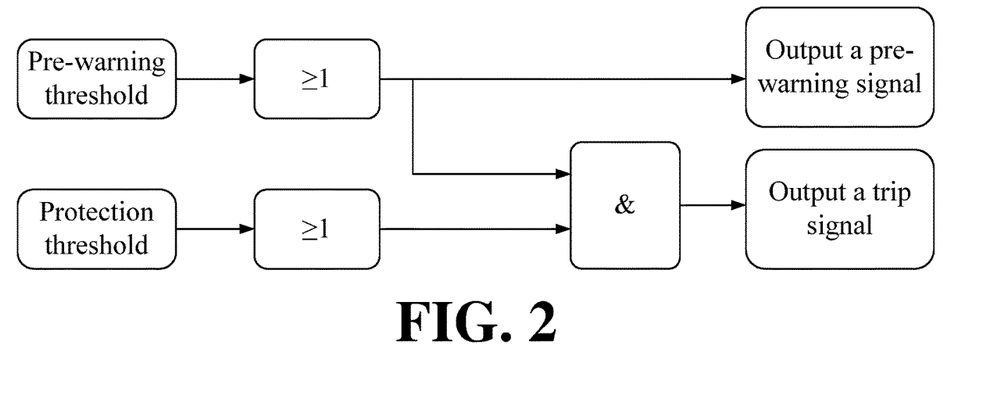
FIG. 2 is a schematic logic diagram of protection determining by an arc light protection system in the prior art.

FIG. 2 is a schematic logic diagram of protection determining by the arc light protection system in the prior art. As shown in FIG. 2, when intensity of only one signal exceeds the level threshold, only a pre-warning signal can be generated to prompt existence of a security risk in a power grid by means of system pre-warning, and no protective action is performed.

In the prior art, a core principle of risk determining by the arc light protection system is two intensity thresholds of "current sensor+ultraviolet arc light sensor". When the intensity of each of the two signals exceeds the specified threshold, the arc light can be considered to be composed of a short-circuited penetrating arc, rather than an intermittent arc or external light interference.

Figure 3:
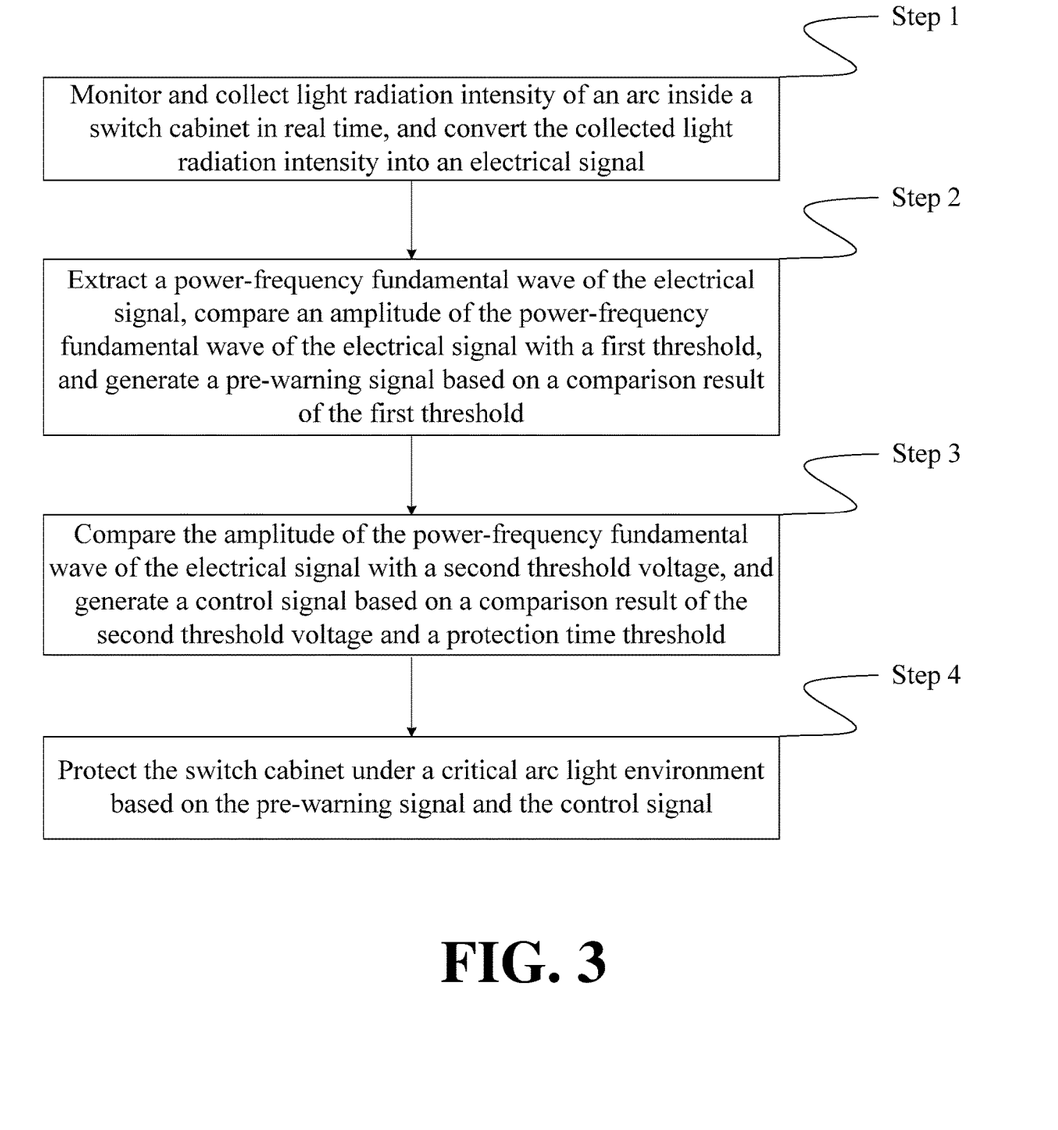
FIG. 3 is a schematic diagram showing steps of a method for determining phase locking of critical arc light according to the present disclosure.

FIG. 3 is a schematic diagram showing steps of a method for determining phase locking of critical arc light according to the present disclosure. As shown in FIG. 3, a first aspect of the present disclosure provides a method for determining phase locking of critical arc light, including steps 1 to 4.

Step 1: Monitor and collect light radiation intensity of an arc inside a switch cabinet in real time, and convert the collected light radiation intensity into an electrical signal.

In the method of the present disclosure, arc light inside the switch cabinet can be collected first. In a collection process, the obtained arc light is characterized by light intensity information. Since light intensity information of the arc is directly related to current intensity of the arc that emits the arc light, intensity information of the arc light is collected in the present disclosure.

The method in the present disclosure can not only be used inside the switch cabinet, but also be used in a relatively closed area with less ambient light and in which a large number of relays, air switches and other elements are integrated, for example, a cable chamber, on a power grid path for high-voltage strong-electricity transmission.

In the method of the present disclosure, intensity of the arc light can be obtained by collecting the intensity information of the arc light. Since most of main components of the arc light are in an ultraviolet light wave band, the intensity of the arc light can be collected based on the ultraviolet light wave band in the present disclosure. In a collection process, a photocurrent signal can be generated by using an ultraviolet light sensor based on detected light intensity. Frequency and intensity information of the photocurrent signal can well represent whether there is abnormal discharge or an arc caused by an insulation fault. For example, when it is found that a photocurrent contains a high-component power-frequency fundamental wave, it can be determined that the signal is caused by an abnormal arc of a bus.

If the arc is caused by current discharge of the bus, a proportion of intensity of the power-frequency fundamental wave in the arch to total intensity of the arch is very high, while intensity of electromagnetic radiation and other interference generated in a discharge process is relatively low. Therefore, intensity of each different component in the arc is sequentially represented by intensity and a frequency of the arc light, intensity and a frequency of a current signal converted from the arc light, and intensity and a frequency of a voltage signal converted from the current signal, so as to calculate intensity components of voltage signals in a plurality of different frequency bands in the total voltage signal.

Therefore, abnormal discharge parameters caused by various elements in a power system, rather than discharge parameters caused by other factors, can be obtained based on a proportion of intensity of a voltage signal to total signal intensity in a power-frequency fundamental band. A confidence level of the discharge parameter adopted in the present disclosure is greatly improved compared with that in the method in the prior art.

Step 2: Extract a power-frequency fundamental wave of the electrical signal, compare an amplitude of the power-frequency fundamental wave of the electrical signal with a first threshold, and generate a pre-warning signal based on a comparison result of the first threshold.

In the present disclosure, the power-frequency fundamental wave of the electrical signal may be extracted by using a frequently-used method in the prior art, for example, a phase-locked amplifier. Specifically, according to a working principle of the phase-locked amplifier, one input terminal of the phase-locked amplifier can receive a reference signal that has a power-frequency fundamental frequency and is used to provide reference, and the electrical signal and the reference signal are input into the phase-locked amplifier at the same time, such that the phase-locked amplifier can filter out a power-frequency fundamental component. After the power-frequency fundamental component is extracted, an amplitude of the component can be compared with the first threshold first to obtain the pre-warning signal.

It can be understood that the pre-warning signal involved in the present disclosure is used to provide pre-warning for a device or operation and maintenance personnel, that is, to inform, by using various upper computer systems, the system operation and maintenance personnel or the device of a risk of abnormal discharge at a position where a current switch cabinet or another apparatus of the present disclosure is disposed. Although the current abnormal discharge is not enough to cause a fault to a power grid, if this abnormality occurs frequently or exists for a long time, it should be paid attention to and reasonably resolved. For example, when the pre-warning signal occurs, the operation and maintenance personnel should check whether an insulating element in the switch cabinet is aged or damaged, whether internal and external environments of the switch cabinet conform to a device operating environment, and the like, and check and handle a potential safety risk as early as possible.

Preferably, in step 2, the first threshold U1 is compared with a maximum amplitude of a power-frequency fundamental signal Uac, and when the maximum amplitude of the power-frequency fundamental signal Uac is greater than or equal to the first threshold U1, the pre-warning signal is generated.

In the present disclosure, after the power-frequency fundamental signal in the electrical signal is extracted, an amplitude of the power-frequency fundamental signal can be extracted. It can be understood that the power-frequency fundamental signal is a component of the electrical signal, so the amplitude of the power-frequency fundamental signal must be less than a total amplitude of the electrical signal.

Generally, because the electrical signal is generated through intensity collection of the arc light, the electrical signal has different characteristics based on different intensity of the arc light in different frequency bands. An electrical signal in time domain can be converted into an electrical signal in frequency domain by using a method similar to Fourier transform. In a digital system, if an electrical signal is sampled, its signal in frequency domain is not continuous. Therefore, the electrical signal can be divided into a plurality of different frequency bands. The power-frequency fundamental signal is caused by leakage of a current on an internal line of the power grid. Therefore, the power-frequency fundamental signal is a leading factor that causes the fault to the power grid and makes a protective action required. Compared with the amplitude of the electrical signal, the amplitude of the power-frequency fundamental signal has more practical reference significance. Therefore, both the pre-warning signal and a control signal in the present disclosure are obtained based on the amplitude of the power-frequency fundamental signal.

In the present disclosure, in order to reasonably design time of giving the pre-warning signal, the first threshold value U1 is set to compare the maximum amplitude of the power-frequency fundamental signal Uac with the first threshold U1. Once the maximum amplitude of the power-frequency fundamental signal Uac exceeds the first threshold U1, the pre-warning signal can be given.

In the present disclosure, alternatively, intensity of the power-frequency fundamental signal Uac may be analyzed, and whether to give the pre-warning signal is determined based on the intensity of the power-frequency fundamental signal Uac. Alternatively, whether to give the pre-warning signal may be determined based on an average amplitude of the power-frequency fundamental signal Uac.

In this embodiment of the present disclosure, the maximum amplitude is selected to perform determining, and on this basis, it is easy to conceive of using the intensity and the average amplitude of the power-frequency fundamental signal to perform determining.

Preferably, the first threshold U1 is generated based on a maximum amplitude of the electrical signal; and when the maximum amplitude of the electrical signal is Ut, the first threshold is Ralert*Ut, where Ralert represents a preset pre-warning constant.

It can be understood that in the present disclosure, if whether to provide pre-warning is determined based on the maximum amplitude of the power-frequency fundamental signal Uac, the selection of the first threshold U1 should also consider the maximum amplitude of the electrical signal. If whether to provide pre-warning is determined based on the average amplitude or the intensity of the power-frequency fundamental signal Uac, the selection of the first threshold U1 should also consider a total average amplitude or intensity of the electrical signal correspondingly.

It can be understood that the technical solution in the present disclosure is essentially to compare a proportion of a power-frequency fundamental component to the total signal. If the proportion is large, the pre-warning signal is generated. If the proportion is small, even if the maximum amplitude, the intensity, or the average amplitude of the total electrical signal is large, it is not necessary to give the corresponding pre-warning signal.

In this way, based on the pre-warning signal in the present disclosure, arc light caused by normal electric leakage in a strong electricity environment is eliminated, so as to accurately screen out arc light caused by a bus short circuit and other abnormalities that can really cause an accident in the strong electricity environment.

In the present disclosure, Ralert may be a preset empirical value ranging from 0 to 1. Since Ralert represents a proportion of the power-frequency fundamental signal to the total electrical signal, this factor can be considered to determine whether to provide pre-warning.

The present disclosure also generates the control signal while obtaining the pre-warning signal. The control signal can be used to control a relay device to achieve relay protection. This part will be described in detail in step 3.

Step 3: Compare the amplitude of the power-frequency fundamental wave of the electrical signal with a second threshold voltage, and generate the control signal based on a comparison result of the second threshold voltage and a protection time threshold.

In the present disclosure, the second threshold voltage is set to determine whether to generate the control signal. The second threshold voltage can also be compared with the power-frequency fundamental component of the electrical signal, but the comparison in step 3 is stricter than that in step 2. As an embodiment of the present disclosure, the second threshold voltage Um is generated based on the maximum amplitude of the electrical signal; and when the maximum amplitude of the electrical signal is Ut, the second threshold voltage is Rpro*Ut, where Rpro represents a preset control constant.

Preferably, in step 3, the second threshold voltage Um is compared with the amplitude of the power-frequency fundamental signal Uac, and when the amplitude of the power-frequency fundamental signal Uac is greater than or equal to the second threshold voltage Um, the control signal is generated.

It can be understood that in the present disclosure, the second threshold voltage may also be compared with any one of a plurality of features of the power-frequency fundamental signal Uac, such as the amplitude, the intensity, or the like. In step 3, when the amplitude or the intensity is used for comparison, the amplitude or the intensity is not an instantaneous value, for example, a maximum amplitude of the signal in a cycle, which is different from that in step 2. In the method of the present disclosure, whether to give the control signal is determined based on a continuous state of the amplitude of the signal in a period of time, for example, in one cycle.

Preferably, the control signal is generated in the following manner: when the amplitude of the power-frequency fundamental signal Uac is greater than or equal to the second threshold voltage Um, a second-threshold comparison signal is output as a high-level signal; or when the amplitude of the power-frequency fundamental signal Uac is less than the second threshold voltage Um, outputting the second-threshold comparison signal is output as a low-level signal; and when a duty ratio of the second-threshold comparison signal is greater than a specified duty ratio threshold Rp, the control signal is generated.

In the method of the present disclosure, the control signal may be obtained indirectly by using one second-threshold comparison signal as a time lag. First, the power-frequency fundamental signal Uac in a period of time, for example, in a whole cycle is compared with the second threshold voltage Um. In the whole cycle, a value of the power-frequency fundamental signal Uac is greater than the second threshold voltage Um in some phases and less than the second threshold voltage Um in other phases. Therefore, the high-level second-threshold comparison signal and the low-level second-threshold comparison signal are generated correspondingly. A larger duty ratio of the high-level second-threshold comparison signal leads to longer time during which the power-frequency fundamental signal Uac exceeds the second threshold voltage Um, and generally leads to a larger maximum amplitude of the power-frequency fundamental signal Uac.

In this case, when the duty ratio of the second-threshold comparison signal is greater than one specified duty ratio threshold Rp, a circuit can be controlled to generate one control signal. The specified duty ratio threshold Rp may be set based on an experience value, and its value ranges from 0 to 1. Preferably, if the duty ratio of the comparison signal is less than the specified duty ratio threshold Rp at current time, the duty ratio of the second-threshold comparison signal is compared with the specified duty ratio threshold Rp after a time delay Δt, and the control signal is generated until the duty ratio of the second-threshold comparison signal is greater than the specified duty ratio threshold Rp.

In the present disclosure, the control signal may be generated in real time, that is, the duty ratio of the second-threshold comparison signal may be determined continuously. If the duty ratio of the second-threshold comparison signal at the current time is less than the specified duty ratio threshold Rp, the duty ratio of the second-threshold comparison signal may be obtained after the specified time delay Δt until the control signal is generated.

It should be noted that if the duty ratio of the second-threshold comparison signal in a current cycle is less than the specified duty ratio threshold Rp at the current time $t_h$, analysis is performed again at next time to obtain duty ratio data of the second-threshold comparison signal at the next time. Specifically, the next time can be obtained according to a formula $t_h=t_h+\Delta t$.

In this manner, the control signal can be obtained in time without a large time delay, such that time of starting protection can be effectively determined in a critical state of change of abnormal discharge.

In addition, in step 3 of the present disclosure, the data obtained in step 2 can be used conveniently to further perform analysis and provide the control signal. Therefore, the circuit used in step 3 is partially based on a circuit module used in step 2, thereby realizing reuse of the circuit. This reduces complexity of the circuit and increases effective use of data and consistency of data sources. In addition, the setting of the comparison with the first threshold and the comparison with the second threshold voltage effectively realizes circuit isolation, such that a circuit module in step 3 has no impact on the circuit module in step 2.

Step 4: Protect the switch cabinet under the critical arc light environment based on the pre-warning signal and the control signal.

After the pre-warning signal and the control signal are obtained by performing step 2 and step 3, in the present disclosure, the switch cabinet can be further protected based on the pre-warning signal and the control signal.

For example, an output terminal of the pre-warning signal may be connected to an external upper computer system to report pre-warning information by using the external upper computer system. Further, the system can also release pre-warning information of the external upper computer system, such that the operation and maintenance personnel or a corresponding electrical device can obtain the pre-warning information, so as to provide pre-warning.

In addition, an output terminal of the control signal may be connected to a relay protection unit, such that the relay protection unit can realize a rapid protective action based on the control signal. This process is completely automatic, so the protection is accurate and fast, fully achieving reliable protection against the abnormal discharge in the switch cabinet.

Figure 4:
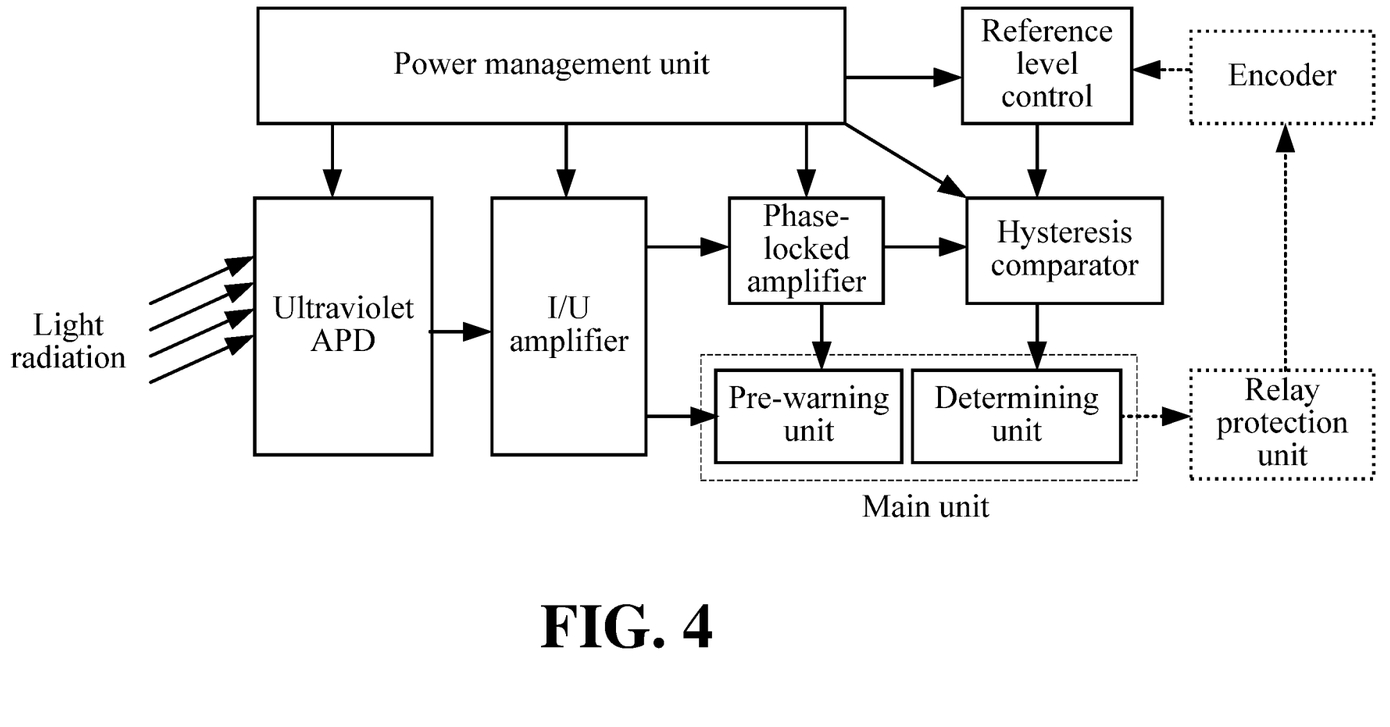
FIG. 4 is a schematic diagram of a frame structure of an apparatus for determining phase locking of critical arc light according to the present disclosure.

FIG. 4 is a schematic diagram of a frame structure of an apparatus for determining phase locking of critical arc light according to the present disclosure. As shown in FIG. 4, a second aspect of the present disclosure provides an apparatus for determining phase locking of critical arc light. The apparatus includes a collection module, a first comparison module, a second comparison module, and a control module. The collection module is configured to monitor and collect light radiation intensity of an arc inside a switch cabinet in real time, and convert the collected light radiation intensity into an electrical signal. The first comparison module is configured to extract a power-frequency fundamental wave of the electrical signal, compare an amplitude of the power-frequency fundamental wave of the electrical signal with a first threshold, and generate a pre-warning signal based on a comparison result of the first threshold. The second comparison module is configured to compare an amplitude of the power-frequency fundamental wave of the electrical signal with a second threshold voltage, and generate a control signal based on a comparison result of the second threshold voltage and a protection time threshold. The control module is configured to protect the switch cabinet under the critical arc light environment based on the pre-warning signal and the control signal.

It can be understood that the collection module, the first comparison module, the second comparison module, and the control module in the present disclosure can be configured to execute steps 1 to 4 in the corresponding method of the present disclosure respectively. In addition, although each element in the apparatus is described by module, it does not mean that a layout of each element in the module is distributed based on different modules. The above-mentioned modules recorded in the present disclosure are virtual modules that realize a plurality different functions.

For example, in the collection module in the present disclosure, an element for collecting arc light should be disposed inside the switch cabinet, while an element for amplifying the arc light may be disposed outside the switch cabinet and integrated in a main body of the apparatus. Moreover, the element for amplifying the arc light and the main body are connected by a line.

Preferably, the collection module includes an ultraviolet light probe and a current-to-voltage converter, where the ultraviolet light probe is an ultraviolet avalanche photo-diode, which is disposed in the switch cabinet to collect light radiation intensity inside the switch cabinet, and an output terminal of the ultraviolet light probe is connected to an input terminal of the current-to-voltage converter; and the current-to-voltage converter converts a current signal of the light radiation intensity collected by the ultraviolet light probe into a voltage signal, and an output terminal of the current-to-voltage converter is connected to the first comparison module.

It can be understood that since main components of the arc light are in an ultraviolet wave band, only an ultraviolet light probe needs to be disposed in the present disclosure. It can be understood that arc light in other wave bands is not mainly caused by electric leakage of a line in a power grid, but may be caused by indirect scattering and reflection of the arc light caused by the electric leakage of the line in the power grid. Therefore, in the present disclosure, the light of this wavelength is not collected.

An ultraviolet avalanche photodiode can collect intensity of the arc light and convert the collected intensity into the electrical signal. The electrical signal mainly represents intensity and frequency characteristics of the arc light in a form of a current, so it is necessary to further convert the current signal. After the current signal is input into the current-to-voltage converter in the body of the apparatus in the present disclosure through a transmission line, the current-to-voltage converter can convert the current signal into a voltage signal, and amplify the voltage signal, such that an output of the voltage signal can fully meet a requirement for realizing a function of a next-stage circuit and a requirement for performing determining accurately.

Preferably, the first comparison module includes a phase-locked amplifier and a pre-warning unit. The phase-locked amplifier with an input terminal connected to a first output terminal of the current-to-voltage converter and an output terminal connected to the pre-warning unit is configured to extract a power-frequency fundamental signal Uac from the electrical signal and input the power-frequency fundamental signal into the pre-warning unit. The pre-warning unit with an input terminal connected to the first output terminal of the current-to-voltage converter and an output terminal connected to an external upper computer system is configured to compare the first threshold U1 with an amplitude of the power-frequency fundamental signal Uac, and send the pre-warning signal to the upper computer system.

It can be understood that the first comparison module in the present disclosure can receive the voltage signal from the collection module, and extract the power-frequency fundamental signal Uac of the voltage signal by using the phase-locked amplifier.

As a frequently-used signal filtering element in a circuit, the phase-locked amplifier can ensure, based on a control level, that a signal of a specific frequency band can pass through, thereby filtering the power-frequency fundamental signal Uac. In addition, the power-frequency fundamental signal Uac can be sent to the pre-warning unit through the phase-locked amplifier, and the pre-warning unit may be implemented by using a frequently-used comparator in the prior art. The comparator compares the power-frequency fundamental signal Uac with the first threshold U1 to generate the pre-warning signal.

It can be understood that in the present disclosure, a value of the first threshold U1 may be changeable during the generation of the pre-warning signal. In other words, a reference voltage of one of input terminals of the comparator is changeable. The reference voltage nay be implemented by a variable reference signal. The content of this part is not shown in FIG. 4. Specifically, the reference signal can be directly transmitted to the pre-warning unit by a current/voltage amplifier. The pre-warning unit receives the electrical signal output by the current/voltage amplifier and generates the first threshold based on a specified proportion.

Preferably, the first comparison module further includes a first level control unit; and the first level control unit is configured to obtain a power frequency and generate a sampling frequency of the phase-locked amplifier based on the power frequency.

It can be understood that the first level control unit in the first comparison module may set the sampling frequency of the phase-locked amplifier based on the power frequency. As a general method in the prior art, this setting method is not described in detail in the present disclosure.

Preferably, the sampling frequency of the phase-locked amplifier ranges from 50 Hz to 60 Hz. When the sampling frequency of the phase-locked amplifier is set to a fixed value from 50 Hz to 60 Hz, the phase-locked amplifier can effectively obtain a power frequency component and filter out other components.

Preferably, the second comparison module includes a hysteresis comparator and a determining unit, where the hysteresis comparator with an input terminal connected to the output terminal of the phase-locked amplifier and an output terminal connected to the determining unit is configured to compare the second threshold voltage Um with the amplitude of the power-frequency fundamental signal Uac, and send a second-threshold comparison signal to the determining unit; and the determining unit with an input terminal connected to the output terminal of the hysteresis comparator and an output terminal connected to an external relay protection unit is configured to determine a duty ratio of the second-threshold comparison signal, generate the control signal, and send the control signal to the external relay protection unit.

It can be understood that the hysteresis comparator and the determining unit in the second comparison module in the present disclosure successively receive an output from the phase-locked amplifier. The hysteresis comparator can compare the power-frequency fundamental signal Uac with the second threshold voltage Um, and generate the second-threshold comparison signal by determining obtained high-level and low-level signals.

The determining unit in the present disclosure can extract the duty ratio of the second-threshold comparison signal, and obtain the control signal by comparing the duty ratio with the specified duty ratio threshold Rp.

Preferably, the second comparison module further includes a second level control unit; and the second level control unit is configured to control a value of the second threshold voltage Um of the hysteresis comparator.

In the present disclosure, the second comparison module can obtain the second threshold voltage Um of the hysteresis comparator. It can be understood that a value of the second threshold voltage Um is fixed in a specific process of determining the power-frequency fundamental signal Uac. However, when the apparatus in the present disclosure is connected to the relay protection unit and plays a protective role, the apparatus in the present disclosure can improve the value of the second threshold voltage Um based on a model, performance, a parameter, and the like of the relay protection unit.

Preferably, the second level control unit generates the second threshold voltage Um based on control of an external encoder, and controls the hysteresis comparator based on the second threshold voltage Um; and the external encoder is connected to the external relay protection unit, and configured to encode a reference level of the second threshold voltage Um based on an instruction issued by the external relay protection unit.

It can be understood that in the present disclosure, the value of the second threshold voltage Um may be adjusted. An adjustment circuit unit is a reference level control module in FIG. 4, which is also referred to as the second level control unit in this specification. Specifically, the relay protection unit in the present disclosure can adjust the value of the second threshold voltage Um based on a determining result of the determining unit, for example, may send an instruction to an encoder, such that the encoder can perform encoding after receiving the instruction from the relay protection unit and send a code to the second level control unit. After receiving the code, the second level control unit generates a more reasonable second threshold voltage Um, so as to update comparison logic of the hysteresis comparator.

In this embodiment of the present disclosure, the first level control unit, the determining unit, the second level control unit, and the control module each may be one or more processors or controllers that each have a communication interface, can realize a communication protocol, and may further include a memory, a related interface and system transmission bus, and the like if necessary. The processor or controller executes program-related code to realize a corresponding function. In an alternative solution, the first level control unit, the determining unit, the second level control unit, and the control module share an integrated chip or share devices such as a controller and a memory. The shared controller or chip executes program-related code to realize a corresponding function. The external relay protection unit is a relay protection apparatus frequently used in the power field. The power management unit is a power management and control apparatus frequently used in the power field.

Figure 5:
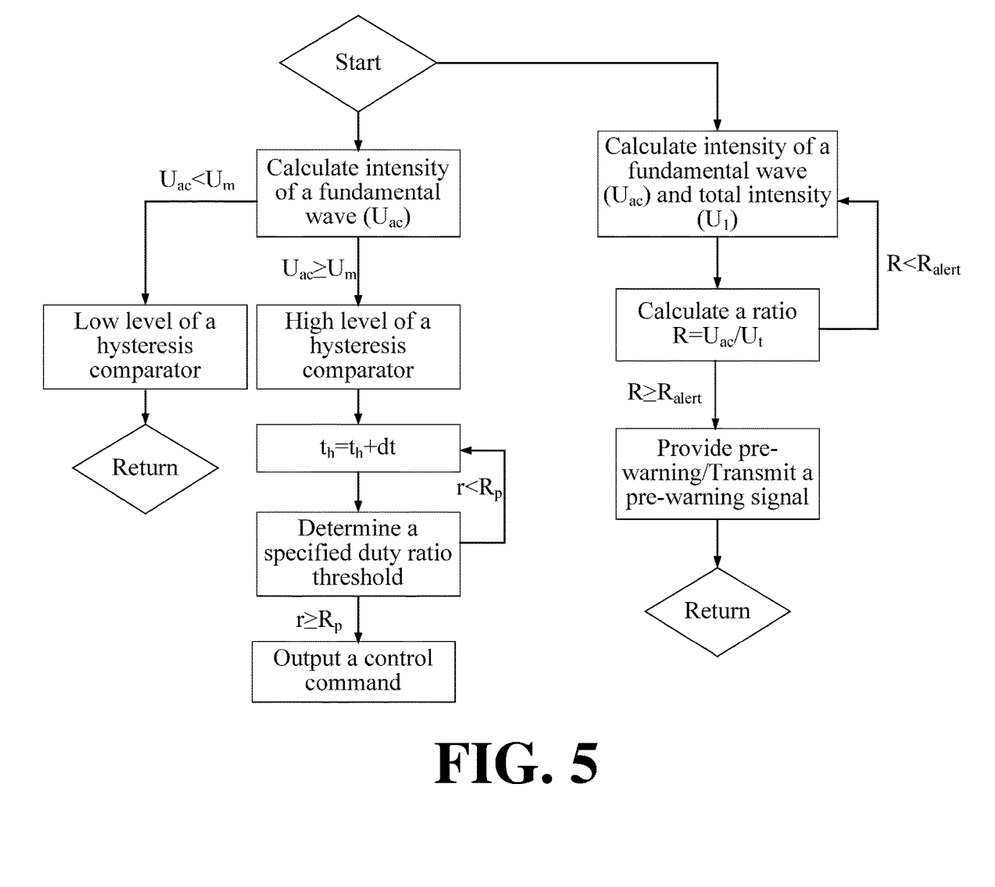
FIG. 5 is a schematic logic diagram of protection and pre-warning determining by an apparatus for determining phase locking of critical arc light according to the present disclosure.

FIG. 5 is a schematic logic diagram of protection and pre-warning determining by an apparatus for determining phase locking of critical arc light according to the present disclosure. As shown in FIG. 5, as mentioned above, a pre-warning signal and a control signal are generated separately in the present disclosure. The pre-warning signal can be generated by comparing a power-frequency fundamental signal with an electrical signal. The control signal can be generated by comparing the power-frequency fundamental signal with the electrical signal.

Preferably, the apparatus includes a plurality of channels, where each channel is configured to collect light radiation intensity of one arc and generate one pre-warning signal and one control signal based on the light radiation intensity of the arc; and the apparatus provides an input port, a pre-warning signal output port, and a control signal output port for each signal.

Figure 6:
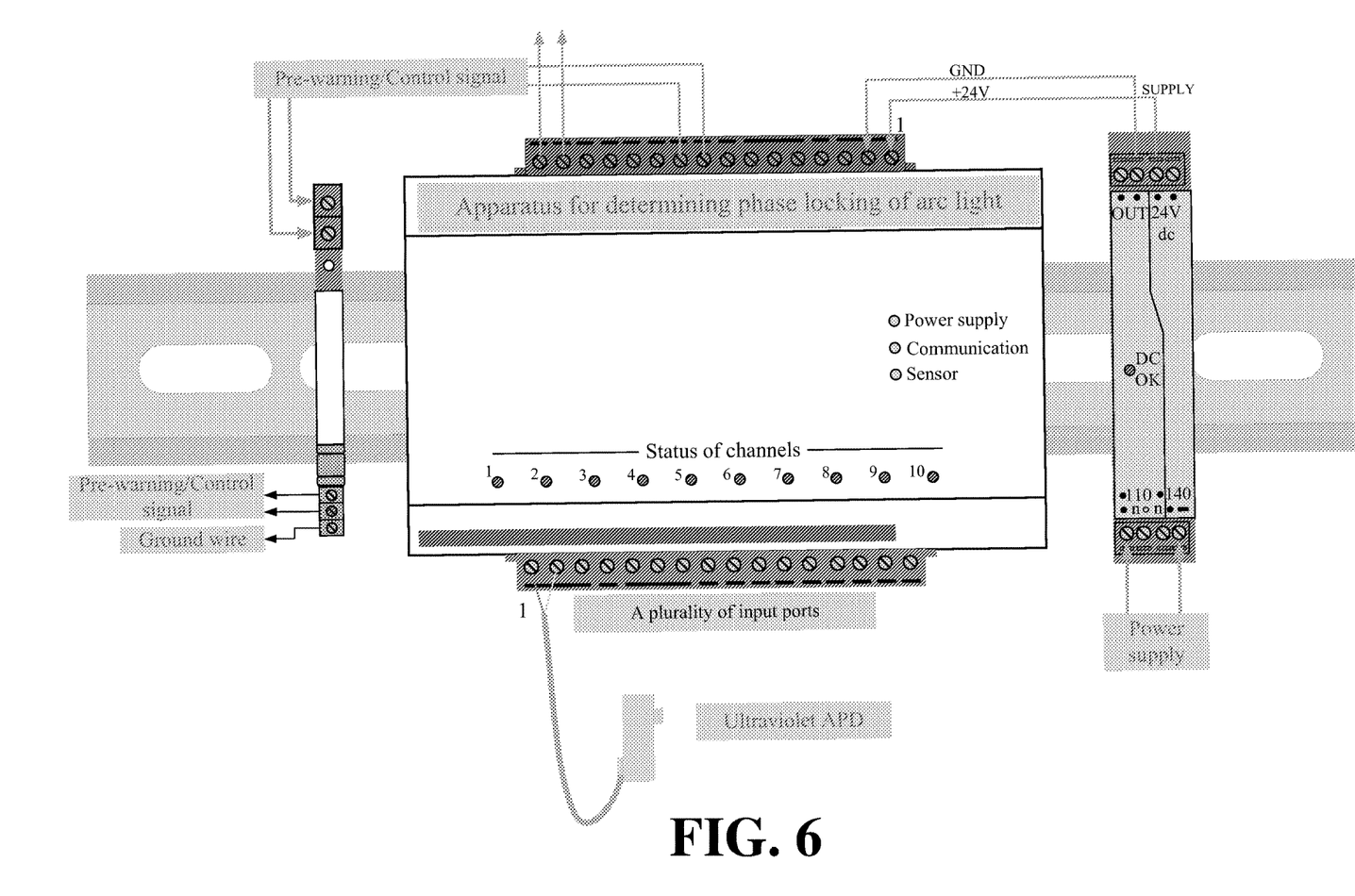
FIG. 6 is a schematic diagram showing a system layout of an apparatus for determining phase locking of critical arc light according to the present disclosure.

FIG. 6 is a schematic diagram showing a system layout of an apparatus for determining phase locking of critical arc light according to the present disclosure. As shown in FIG. 6, in the present disclosure, the apparatus for determining phase locking of critical arc light may be disposed on a rack together with other related apparatuses. The rack may be disposed adjacent to a switch cabinet or another power grid device for which abnormal arc light needs to be detected.

Generally, the apparatus for determining phase locking of critical arc light in the present disclosure may be an integrated apparatus, for example, an apparatus integrated with a plurality of channels, where each channel can receive, process, and analyze one arc light signal to generate a pre-warning signal and a control signal for the arc light signal.

As an embodiment of the present disclosure, the apparatus in FIG. 6 may include 10 groups of the above-described collection modules, first comparison modules, second comparison modules, and control modules. In other words, the apparatus can detect and process 10 different arc light signals at the same time. In addition, in the present disclosure, an ultraviolet light probe is separated from a body of the apparatus, and connection and data transmission are realized through a connection line and a plurality of input interfaces on the body of the apparatus.

A panel of the apparatus may further be provided with indicators indicating whether a power supply, communication, and a sensor are normal, and status indicators of 10 channels. In addition, an Ethernet interface and other devices may also be added to facilitate upgrade of software in the apparatus.

The apparatus in the present disclosure may include a signal output port to output the pre-warning signal and the control signal of each channel. In addition, a power module may be externally installed on the rack to power the apparatus. A module on the left side of FIG. 6 is a terminal block for connecting an external relay protection unit or a pre-warning unit to convert interface formats of the pre-warning signal, the control signal, and a line such as a ground wire. Since the main content of the present disclosure is not involved, no specific description is made herein.

The present disclosure has the following beneficial effects compared with the prior art: The method and the apparatus for determining phase locking of critical arc light can extract a power-frequency fundamental wave from an arc light signal, and obtain pre-warning and control signals through calculation based on an amplitude of a power-frequency fundamental signal, so as to perform a protective action. The method in the present disclosure is characterized by simple ideas, simple apparatuses, elements, and structures, low system complexity, low hardware costs, and easy installation and maintenance.

The applicant of the present disclosure has made a detailed description of the implementation examples of the present disclosure with reference to the accompanying drawings in the specification. However, those skilled in the art should understand that the above implementation examples are only preferred implementation solutions of the present disclosure, and the detailed description is only to help readers better understand the spirit of the present disclosure, rather than to limit the protection scope of the present disclosure. On the contrary, any improvement or modification based on the spirit of the present disclosure shall fall within the protection scope of the present disclosure.

The invention claimed is:

1. A method for determining phase locking of critical arc light, comprising the following steps:
    step 1: monitoring and collecting light radiation intensity of an arc inside a switch cabinet in real time, and converting the collected light radiation intensity into an electrical signal;
    step 2: extracting a power-frequency fundamental wave of the electrical signal, comparing an amplitude of the power-frequency fundamental wave of the electrical signal with a first threshold, and generating a pre-warning signal based on a comparison result of the first threshold;
    step 3: comparing the amplitude of the power-frequency fundamental wave of the electrical signal with a second threshold voltage, and generating a control signal based on a comparison result of the second threshold voltage and a protection time threshold; and
    step 4: protecting the switch cabinet under the critical arc light environment based on the pre-warning signal and the control signal.

2. The method for determining phase locking of critical arc light according to claim 1, wherein
    in step 2, the first threshold U1 is compared with a maximum amplitude of a power-frequency fundamental signal Uac, and when the maximum amplitude of the power-frequency fundamental signal Uac is greater than or equal to the first threshold U1, the pre-warning signal is generated.

3. The method for determining phase locking of critical arc light according to claim 2, wherein
    the first threshold U1 is generated based on a maximum amplitude of the electrical signal; and
    when the maximum amplitude of the electrical signal is Ut, the first threshold is Ralert*Ut, wherein
    Ralert represents a preset pre-warning constant.

4. The method for determining phase locking of critical arc light according to claim 1, wherein
    in step 3, the second threshold voltage Um is compared with an amplitude of a power-frequency fundamental signal Uac, and when the amplitude of the power-frequency fundamental signal Uac is greater than or equal to the second threshold voltage Um, the control signal is generated.

5. The method for determining phase locking of critical arc light according to claim 4, wherein
    in step 3, the control signal is generated in the following manner:
    when the amplitude of the power-frequency fundamental signal Uac is greater than or equal to the second threshold voltage Um, a second-threshold comparison signal is output as a high-level signal; or
    when the amplitude of the power-frequency fundamental signal Uac is less than the second threshold voltage Um, the second-threshold comparison signal is output as a low-level signal; and
    when a duty ratio of the second-threshold comparison signal is greater than a specified duty ratio threshold Rp, the control signal is generated.

6. The method for determining phase locking of critical arc light according to claim 5 wherein
    if the duty ratio of the second-threshold comparison signal is less than the specified duty ratio threshold Rp at current time, the duty ratio of the second-threshold comparison signal is compared with the specified duty ratio threshold Rp again after a time delay Δt, and the control signal is generated until the duty ratio of the second-threshold comparison signal is greater than the specified duty ratio threshold Rp.

7. An apparatus for determining phase locking of critical arc light, wherein
    the apparatus comprises a collection module, a first comparison module, a second comparison module, and a control module, wherein
    the collection module is configured to monitor and collect light radiation intensity of an arc inside a switch cabinet in real time, and convert the collected light radiation intensity into an electrical signal;
    the first comparison module is configured to extract a power-frequency fundamental wave of the electrical signal, compare an amplitude of the power-frequency fundamental wave of the electrical signal with a first threshold, and generate a pre-warning signal based on a comparison result of the first threshold;
    the second comparison module is configured to compare an amplitude of the power-frequency fundamental wave of the electrical signal with a second threshold voltage, and generate a control signal based on a comparison result of the second threshold voltage and a protection time threshold; and
    the control module is configured to protect the switch cabinet under the critical arc light environment based on the pre-warning signal and the control signal.

8. The apparatus for determining phase locking of critical arc light according to claim 7, wherein
    the collection module comprises an ultraviolet light probe and a current-to-voltage converter, wherein
    the ultraviolet light probe is an ultraviolet avalanche photodiode, which is disposed in the switch cabinet to collect the light radiation intensity inside the switch cabinet, and an output terminal of the ultraviolet light probe is connected to an input terminal of the current-to-voltage converter; and
    the current-to-voltage converter converts a current signal of the light radiation intensity collected by the ultraviolet light probe into a voltage signal, and an output terminal of the current-to-voltage converter is connected to the first comparison module.

9. The apparatus for determining phase locking of critical arc light according to claim 8, wherein
    the first comparison module comprises a phase-locked amplifier and a pre-warning unit, wherein
    the phase-locked amplifier with an input terminal connected to a first output terminal of the current-to-voltage converter and an output terminal connected to the pre-warning unit is configured to extract a power-frequency fundamental signal Uac from the electrical signal and input the power-frequency fundamental signal into the pre-warning unit; and the pre-warning unit with an input terminal connected to the first output terminal of the current-to-voltage converter and an output terminal connected to an external upper computer system is configured to compare the first threshold U1 with an amplitude of the power-frequency fundamental signal Uac, and send the pre-warning signal to the external upper computer system.

10. The apparatus for determining phase locking of critical arc light according to claim 9, wherein
the first comparison module further comprises a first level control unit; and
the first level control unit is configured to obtain a power frequency and generate a sampling frequency of the phase-locked amplifier based on the power frequency.

11. The apparatus for determining phase locking of critical arc light according to claim 10, wherein
the sampling frequency of the phase-locked amplifier ranges from 50 Hz to 60 Hz.

12. The apparatus for determining phase locking of critical arc light according to claim 9, wherein
the second comparison module comprises a hysteresis comparator and a determining unit, wherein
the hysteresis comparator with an input terminal connected to the output terminal of the phase-locked amplifier and an output terminal connected to the determining unit is configured to compare the second threshold voltage Um with the amplitude of the power-frequency fundamental signal Uac, and send a second-threshold comparison signal to the determining unit; and
the determining unit with an input terminal connected to the output terminal of the hysteresis comparator and an output terminal connected to an external relay protection unit is configured to determine a duty ratio of the second-threshold comparison signal, generate the control signal, and send the control signal to the external relay protection unit.

13. The apparatus for determining phase locking of critical arc light according to claim 12, wherein
the second comparison module further comprises a second level control unit; and
the second level control unit is configured to control a value of the second threshold voltage Um of the hysteresis comparator.

14. The apparatus for determining phase locking of critical arc light according to claim 13, wherein
the second level control unit generates the second threshold voltage Um based on control of an external encoder, and controls the hysteresis comparator based on the second threshold voltage Um; and
the external encoder is connected to the external relay protection unit, and configured to encode a reference level of the second threshold voltage Um based on an instruction issued by the external relay protection unit.

15. The apparatus for determining phase locking of critical arc light according to claim 14, wherein
the apparatus comprises a plurality of channels, wherein each channel is configured to collect light radiation intensity of one arc and generate one pre-warning signal and one control signal based on the light radiation intensity of the arc; and
the apparatus provides an input port, a pre-warning signal output port, and a control signal output port for each signal.

* * * * *